(12) United States Patent
Cuylen

(10) Patent No.: US 7,706,407 B2
(45) Date of Patent: Apr. 27, 2010

(54) METHOD FOR CODING DATA PACKETS FOR TRANSMISSION OVER AN AIR INTERFACE

(75) Inventor: Michael Cuylen, Zirndorf (DE)

(73) Assignee: Siemens Aktiengesellschaft, Munich (DE)

( * ) Notice: Subject to any disclaimer, the term of this patent is extended or adjusted under 35 U.S.C. 154(b) by 1229 days.

(21) Appl. No.: 10/397,247

(22) Filed: Mar. 27, 2003

(65) Prior Publication Data

US 2003/0223515 A1 Dec. 4, 2003

Related U.S. Application Data

(63) Continuation of application No. PCT/DE01/03532, filed on Sep. 14, 2001.

(30) Foreign Application Priority Data

Sep. 27, 2000 (DE) ................. 100 49 162

(51) Int. Cl.
*H04J 3/16* (2006.01)
(52) U.S. Cl. ............... 370/470; 370/472; 370/474
(58) Field of Classification Search ......... 370/470–474, 370/203, 206; 341/52, 68, 59, 69, 70, 71, 341/72; 340/10.2, 10.3, 10.4; 369/59.23; 714/776

See application file for complete search history.

(56) References Cited

U.S. PATENT DOCUMENTS

| | | | | |
|---|---|---|---|---|
| 5,010,554 A | * | 4/1991 | Bechtel et al. | 714/759 |
| 5,132,660 A | * | 7/1992 | Chen et al. | 340/428 |
| 5,144,314 A | * | 9/1992 | Malmberg et al. | 342/44 |
| 5,712,630 A | | 1/1998 | Nanboku et al. | |
| 5,841,813 A | * | 11/1998 | van Nee | 375/279 |
| 6,005,840 A | * | 12/1999 | Awater et al. | 370/206 |
| 6,411,629 B1 | * | 6/2002 | Bentall et al. | 370/458 |
| 2005/0229084 A1 | * | 10/2005 | Cuylen | 714/776 |

OTHER PUBLICATIONS

Benelli et al., A coding and retransmitting protocol for mobile radio data transmission, 1999, IEEE, entire document.*
ISO/IEC-15693-2, Indentification cards- contactless integrated circuits cards- part 2- air interface and initialliztion, May 2000, ISO/IEC, first edition.*

* cited by examiner

*Primary Examiner*—Ian N Moore
(74) *Attorney, Agent, or Firm*—Staas & Halsey LLP

(57) ABSTRACT

A method for coding data packets (DP) having at least one control command (S) and one data byte (B). The data packets are divided into sequences of control and/or data time blocks (SB, DB) each having a predetermined number (M) of time segments (ZS), whereby these can assume an on-value or off-value (EW, AW). At least one control command is coded in the time segments of a control time block, and a data byte is coded in the time segments of two data time blocks, whereby an on-value follows each time segment with an off-value. The method can be advantageously used in identification systems (IS) in mobile data carriers (DT) and in write/read devices (SL). The method results in the provision of a higher data transfer rate for transmitting data packets.

19 Claims, 6 Drawing Sheets

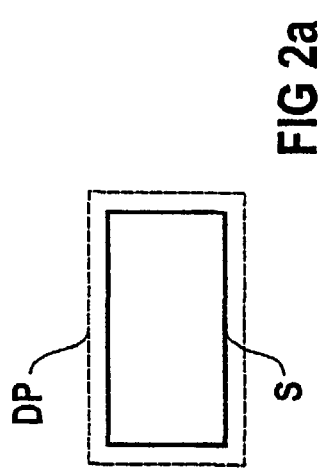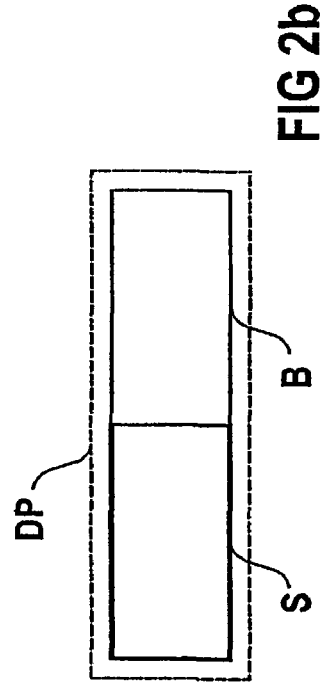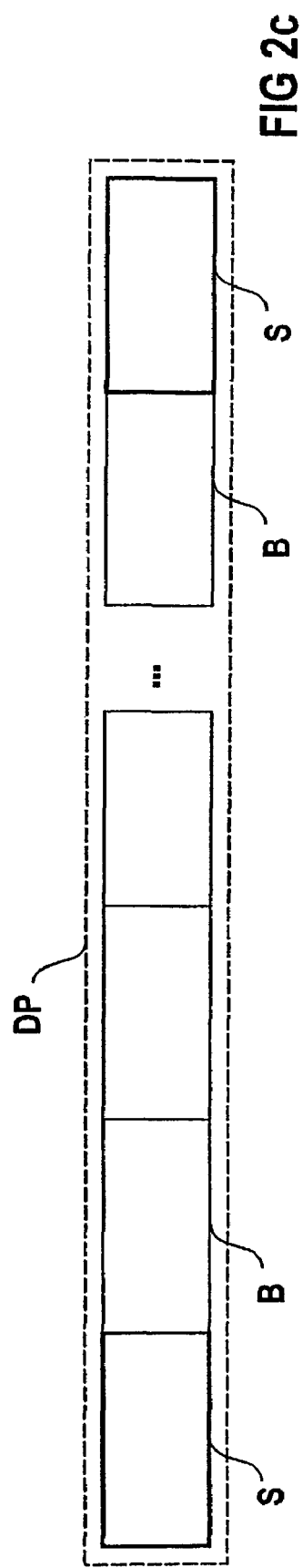

| hex | Bit 0 | Bit 1 | Bit 2 | Bit 3 | TS 1 | TS 2 | TS 3 | TS 4 | TS 5 | TS 6 | TS 7 | TS 8 | TS 9 | TS 10 | TS 11 |
|---|---|---|---|---|---|---|---|---|---|---|---|---|---|---|---|
| 0 | 0 | 0 | 0 | 0 |   |   |   | ■ |   |   |   |   |   |   |   |
| 1 | 0 | 0 | 0 | 1 |   |   |   |   | ■ |   |   |   |   |   |   |
| 2 | 0 | 0 | 1 | 0 |   |   |   |   |   | ■ |   |   |   |   |   |
| 3 | 0 | 0 | 1 | 1 |   |   |   |   |   |   | ■ |   |   |   |   |
| 4 | 0 | 1 | 0 | 0 |   |   |   |   |   |   |   | ■ |   |   |   |
| 5 | 0 | 1 | 0 | 1 |   |   |   |   |   |   |   |   | ■ |   |   |
| 6 | 0 | 1 | 1 | 0 |   |   |   |   |   |   |   |   |   | ■ |   |
| 7 | 0 | 1 | 1 | 1 |   |   |   |   |   |   |   |   |   |   | ■ |
| 8 | 1 | 0 | 0 | 0 |   | ■ |   | ■ |   |   |   |   |   |   |   |
| 9 | 1 | 0 | 0 | 1 |   | ■ |   |   | ■ |   |   |   |   |   |   |
| A | 1 | 0 | 1 | 0 |   | ■ |   |   |   | ■ |   |   |   |   |   |
| B | 1 | 0 | 1 | 1 |   | ■ |   |   |   |   | ■ |   |   |   |   |
| C | 1 | 1 | 0 | 0 |   | ■ |   |   |   |   |   | ■ |   |   |   |
| D | 1 | 1 | 0 | 1 |   | ■ |   |   |   |   |   |   | ■ |   |   |
| E | 1 | 1 | 1 | 0 |   | ■ |   |   |   |   |   |   |   | ■ |   |
| F | 1 | 1 | 1 | 1 |   | ■ |   |   |   |   |   |   |   |   | ■ |

| hex | Bit 4 | Bit 5 | Bit 6 | Bit 7 | TS 1 | TS 2 | TS 3 | TS 4 | TS 5 | TS 6 | TS 7 | TS 8 | TS 9 | TS 10 | TS 11 |
|---|---|---|---|---|---|---|---|---|---|---|---|---|---|---|---|
| 0 | 0 | 0 | 0 | 0 |   |   |   | ■ |   |   |   |   |   |   |   |
| 1 | 0 | 0 | 0 | 1 |   |   |   |   | ■ |   |   |   |   |   |   |
| 2 | 0 | 0 | 1 | 0 |   |   |   |   |   | ■ |   |   |   |   |   |
| 3 | 0 | 0 | 1 | 1 |   |   |   |   |   |   | ■ |   |   |   |   |
| 4 | 0 | 1 | 0 | 0 |   |   |   |   |   |   |   | ■ |   |   |   |
| 5 | 0 | 1 | 0 | 1 |   |   |   |   |   |   |   |   | ■ |   |   |
| 6 | 0 | 1 | 1 | 0 |   |   |   |   |   |   |   |   |   | ■ |   |
| 7 | 0 | 1 | 1 | 1 |   |   |   |   |   |   |   |   |   |   | ■ |
| 8 | 1 | 0 | 0 | 0 |   | ■ |   | ■ |   |   |   |   |   |   |   |
| 9 | 1 | 0 | 0 | 1 |   | ■ |   |   | ■ |   |   |   |   |   |   |
| A | 1 | 0 | 1 | 0 |   | ■ |   |   |   | ■ |   |   |   |   |   |
| B | 1 | 0 | 1 | 1 |   | ■ |   |   |   |   | ■ |   |   |   |   |
| C | 1 | 1 | 0 | 0 |   | ■ |   |   |   |   |   | ■ |   |   |   |
| D | 1 | 1 | 0 | 1 |   | ■ |   |   |   |   |   |   | ■ |   |   |
| E | 1 | 1 | 1 | 0 |   | ■ |   |   |   |   |   |   |   | ■ |   |
| F | 1 | 1 | 1 | 1 |   | ■ |   |   |   |   |   |   |   |   | ■ |

METHOD FOR CODING DATA PACKETS FOR TRANSMISSION OVER AN AIR INTERFACE

This is a Continuation of International Application PCT/DE01/03532, with an international filing date of Sep. 14, 2001, which was published under PCT Article 21(2) in German, and the disclosure of which is incorporated into this application by reference.

FIELD OF AND BACKGROUND OF THE INVENTION

The invention relates to a method for coding data packets that include at least one control command and at least one data byte.

Contactless identification systems operate on the basis of contactless transmission technologies. These may be based on an electromagnetic method, e.g. using light or infrared, or on ultrasound, etc. Systems of this type are used, for example, to identify persons, or moving goods or means of transport. To this end, the necessary data are transmitted from a transceiver device via a contactless data transmission path, e.g. via an air interface, to a data medium and back. The contactless identification system also permits the recording of data, e.g. while the data medium moves past, without the latter having to be inserted into or drawn through a read/write device. Data media of this type are used, for example, as travel tickets with an electronically reloadable credit, whereby the appropriate travel fare is automatically deducted when the means of transport is used.

So that the data media can be used for unlimited periods of time, the integration of chemical energy stores, e.g. batteries, is preferably dispensed with. The requisite electrical energy of the data media is therefore drawn in a contactless manner externally, i.e. from an energy source originating from the transceiver device, e.g. an electrical or magnetic field. Suitable transmission and coding methods are therefore required for communication between the transceiver device and data media of this type. On the one hand, only specific frequency bands are normally released for the transmission of data, e.g. the ISM frequency bands (Industrial, Scientific & Medical), for industrial, scientific and medical applications. Possible national radio regulations may define, inter alia, the modulation bandwidths and field strengths which must be maintained. On the other hand, the transmission and coding methods must also ensure the energy supply of the electronics on the data medium.

Such methods are known, e.g. according to the standard ISO/IEC 15693, Part 2, "Air Interface and Initialization". Methods of this type enable continuous energy supply of the data medium electronics, originating from the energy of the applied carrier frequency of the transceiver device. Here, the carrier frequency is de-activated for a maximum time interval only in order to modulate the data which are to be transmitted. Within this time interval, an energy store previously charged by the electrical or magnetic field must be able to bypass the energy supply of the data medium electronics. A resonant circuit or capacitor on the data medium, for example, can be used as a temporary energy store. Here, the data are coded by de-activating the carrier at defined positions within a cyclical time pattern. Taking into account the aforementioned maximum time interval, the standard furthermore defines the field strength limit values for the sidebands produced through modulation at a specific carrier frequency. The time ratio of the activated to the de-activated carrier frequency on the one hand determines the level of the sideband modulation. Furthermore, consecutive changeovers from the activated to the de-activated carrier frequency also contribute to a significant increase in the sideband modulation. The need to adhere to the sideband limits defined in the standard results in a maximum possible data rate. For an ISM frequency band according to standard 15693, Part 2, page 6, for example, this data rate is 26.48 kbit/s.

The disadvantage of the aforementioned method according to the standard ISO/IEC 15693, Part 2, is that the data rate which is possible for a frequency band is no longer adequate for many applications, or insufficient time is available to transmit the data.

OBJECTS OF THE INVENTION

One object of the invention is therefore to propose a novel coding method which enables a higher data rate for the communication between a read/write device and a data medium. The sideband modulation limits and the guarantee of the energy supply for the data medium are taken into account.

SUMMARY OF THE INVENTION

These and further objects are achieved with the methods recited in the claims, and by an identification system and associated devices based thereon. Advantageous further refinements of the invention are described below and set forth in the dependent claims.

BRIEF DESCRIPTION OF THE DRAWINGS

The invention is explained in more detail with reference to the figures below, in which:

FIGS. 2a-c: show examples of the structure of a data packet which is to be coded by the method according to the invention, FIGS. 4a-c: show an example describing a further design of the method according to the invention for coding a data packet.

DETAILED DESCRIPTION OF THE PREFERRED EMBODIMENTS

Figure 1:
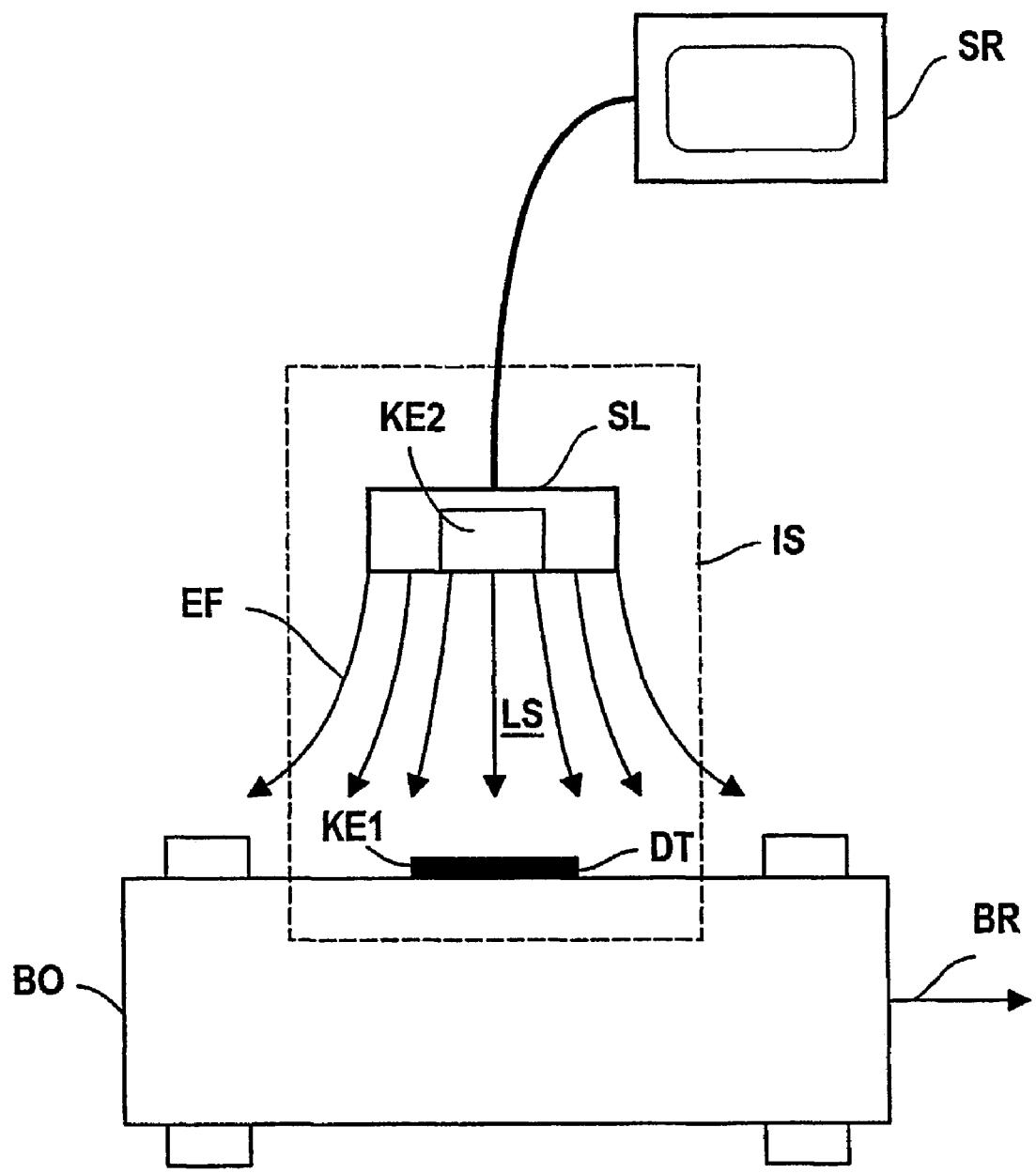
FIG. 1: shows an example of an identification system including a read/write device and a data medium, in each case with a coding device to carry out the method according to the invention for contactless exchange of data packets.

FIG. 1 shows an example of an identification system IS, including a read/write device SL and a data medium DT, each with a coding device KE1, KE2 to carry out the method according to the invention. The data packets DP are transmitted via a contactless data transmission path LS, e.g. an air interface. The upper part of the figure shows an example of a control computer SR, which is connected via an interface to a read/write device SL. Data are transmitted via this interface between the control computer SR and the read/write device SL, e.g. for data recording. The lower part of the figure shows an object BO, e.g. a means of transport, which moves in a direction of movement BR relative to the read/write device SL. A data medium DT is positioned to the side of the moving object BO. The read/write device SL and the data medium DT are connected, by example, via an interface LS, by way of which the data medium DT is supplied with power and the data are transmitted.

The data transmission may serve, e.g., to identify a means of transport BO by the read/write device SL. A further possibility is that, for example, new order data for the delivery of transported goods are transferred to the means of transport BO. Furthermore, energy lines EF are drawn in to illustrate the flow of energy from the read/write device SL to the data medium DT. The carriers of the required energy may, for example, be electrical or magnetic fields, or infrared light, visible or ultraviolet light emitted by the read/write device SL. Further possible energy carriers are microwaves, ultrasound waves or radio waves originating from the read/write device SL.

Control commands ST are required for the communications of a read/write device SL with a data medium DT in order to set the different operating modes for data transmission, e.g. "write data" or "read data". The control commands ST and the data to be transmitted are transmitted by, for example, a control computer SR connected to the read/write device SL, and are transmitted in the form of data packets DP. These data packets contain the necessary control commands ST in the form of control commands S and the data to be transmitted in the form of data bytes B. The data received by the read/write device SL are similarly transmitted in data packets DP to the control computer SR. An eight-bit byte, for example, is used as the smallest data unit for control commands S and data bytes B.

FIGS. 2a-c show examples of the structure of a data packet DP for coding by means of the method according to the invention. FIG. 2a shows a data packet DP having only one single control command S. Possible content of a control command S may be, for example, the aforementioned control commands ST such as "write", "read" or the "end transmission" command.

FIG. 2b shows a data packet DP comprising, for example, a control command S and a data byte B. In this example, the data byte B defines the number of data bytes B to be transmitted.

FIG. 2c shows a possible structure of a data packet DP, starting with a control command ST "Start" of a control command S and following data bytes B. The end of the transmission of a data packet DP may be marked here with a corresponding control command ST "Stop" at the end of the data packet DP.

Figure 3:
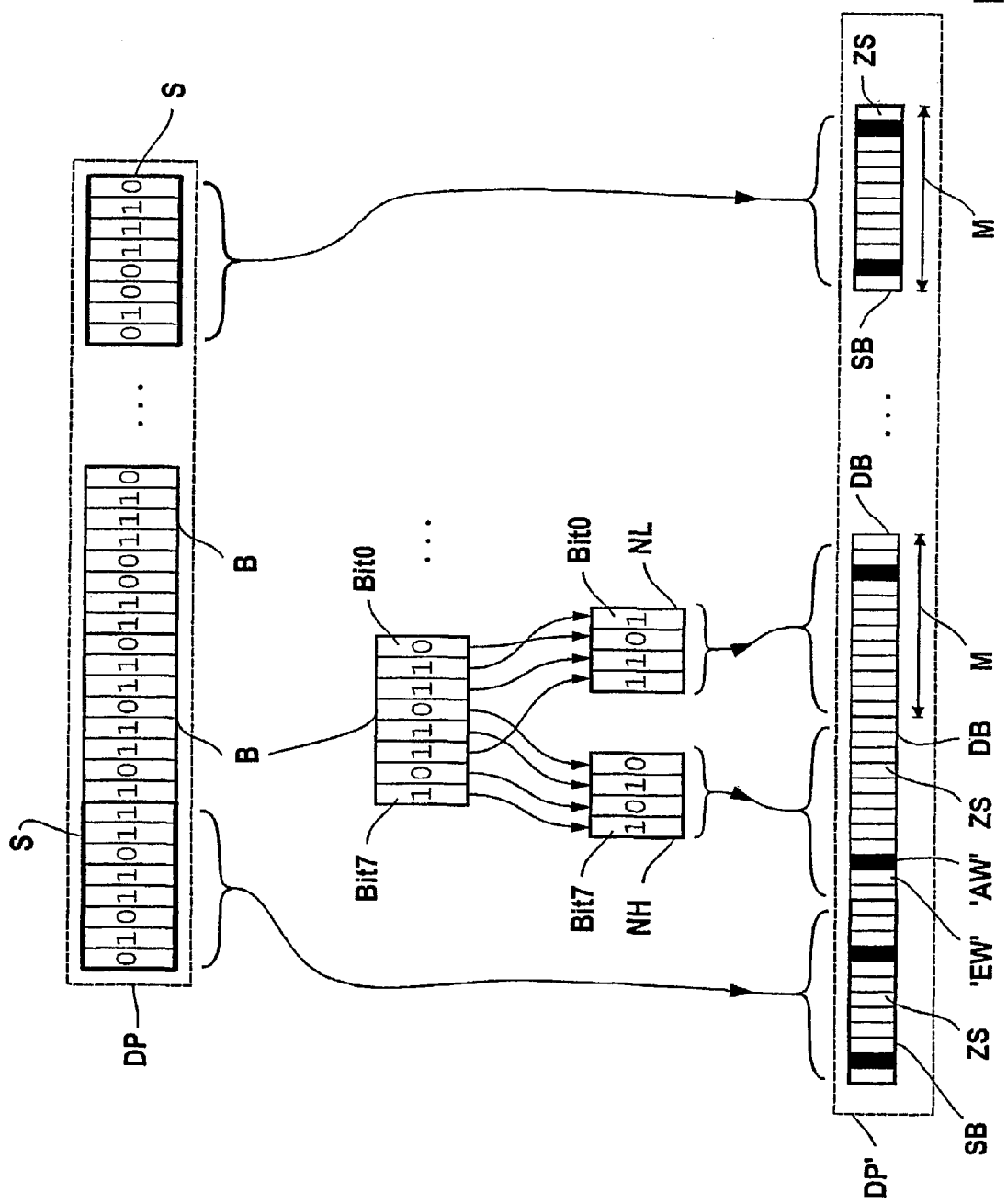
FIG. 3: shows an example describing a design of the method according to the invention for coding a data packet.

FIG. 3 describes, as an example, a design of the method according to the invention for coding a data packet DP. This design has at least one control command S and at least one data byte B. According to the invention, the data packet DP is divided up for coding into sequences of control time blocks and/or data time blocks SB, DB, which are then divided up in each case into a predefined number M of time segments ZS. The time segments ZS may assume an "on" value EW or an "off" value AW. Furthermore, according to the invention, at least one control command S is coded into the time segments ZS of a control time block SB, and one data byte B is in each case coded into the time segments ZS of two consecutive data time blocks DB. The coding is carried out according to the invention in such a way that each time segment ZS with an "off" value AW is followed by at least one time segment ZS with an "on" value.

The example in FIG. 3 furthermore shows a data byte B which has, for example, the value 10110110. According to the invention, this is divided up before coding into the time segments ZS of two consecutive data time blocks DB into two nibbles NH, NL with the values 1010 and 1101. In the example, the value eleven is advantageously selected as the number M of time segments ZS for both control and time blocks SB, DB.

The selection of an identical number M of time segments ZS offers the advantage that, for example, the structure of a control mechanism of a receive device can be simplified.

As explained above, the coding is carried out in such a way that each time segment ZS with an "off" value AW is followed by at least one time segment ZS with an "on" value EW. Here, the energy carrier for the energy supply is de-activated for a time segment ZS with an "off" value AW. An "on" value EW re-activates the energy carrier in a corresponding manner.

The coding explained above advantageously ensures that the energy carrier is de-activated only for a maximum time interval of the duration of a time segment ZS. A continuous energy supply of the data electronics is thereby ensured.

Figure 4C:
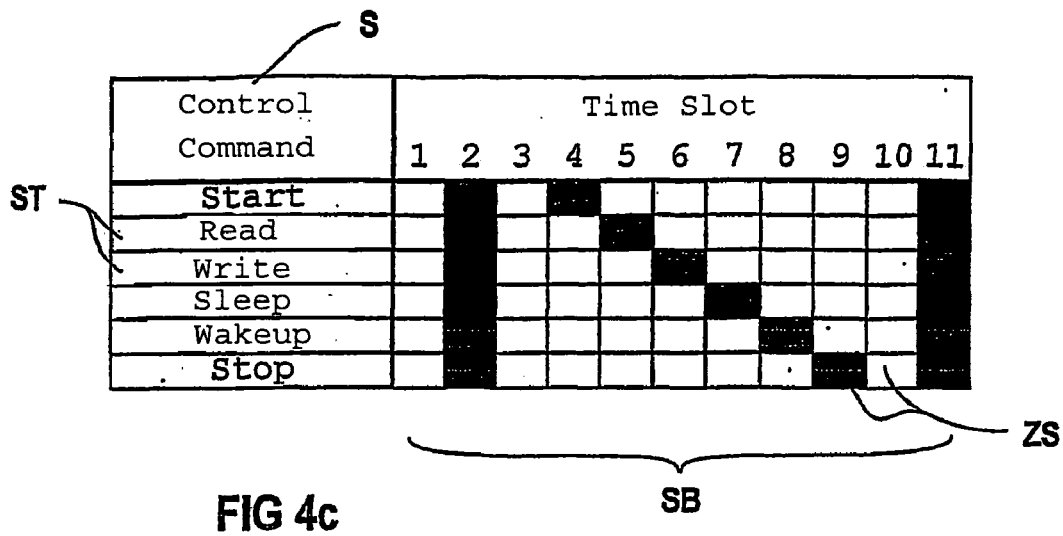

The coding of a data packet DP is explained in more detail according to the inventive method with reference to the example in FIGS. 4a-c. FIG. 4a and FIG. 4b describe the coding of the bits BIT0-BIT7 of two nibbles NH, NL into two data time blocks DB. FIG. 4c shows a possible form of the coding of a control command S into a control time block SB. For the sake of clear explanation, the same number M of time segments ZS is selected as in FIG. 3.

In FIGS. 4a-b, a predefined first number N of the bits BIT0-BIT7 of a nibble NH, NL is selected according to the invention. The selected bits BIT0-BIT7 are then coded into a second number P of selected time segments ZS. The number P of selected time segments ZS has a value which corresponds to the number N of the bits BIT0-BIT7 of a nibble NH, NL exponentiated with base 2. Furthermore, the value three is selected for the number N. According to the invention, the selected time segments ZS are consecutive and have an "on" value EW pre-assigned to them. The respective digital value of the three selected bits BIT0-BIT7 of a nibble NH, NL is then coded according to the invention as an "off" value AW into one of the selected time segments ZS. In the method according to the invention, the coding also takes account of the fact that only sequences of time segments ZS which form a concatenation of a maximum of three "on" and "off" values EW, AW occur within a sequence of data time blocks DB.

For the example in FIG. 4a, this means that the three bits 1, 2, 3 of the nibble NL are in each case assigned to eight consecutive time segments ZS. In FIG. 4b, the bits 5, 6, 7 of the nibble NH are likewise assigned to eight time segments ZS which start, for example, as in FIGS. 4a-b, with the time segment 4. This corresponds to the illustrated number range ZX from 0 to 7. The number range ZX describes the sixteen possible numerical values of a nibble NH, NL from 0 to F in hexadecimal notation.

The remaining number range ZX from 8 to F of the nibbles NH, NL is coded by the remaining bit 4 and bit 7. A concatenation of two time segments ZS is correspondingly assigned to the binary value of the aforementioned bits 4, 7 in the respective data time block DB. The concatenation may, for example, comprise time segments ZS with an "off" and "on" value AW, EW, or time segments ZS with two "on" values EW. According to the example in FIGS. 4a-b, the assignment is performed starting with the second time segment.

FIG. 4c furthermore shows an example of the coding of a control command S according to the invention. Here, the e.g. six control commands ST of the control command S are coded in such a way that a time segment ZS with an "off" value AW is followed by at least one time segment ZS with an "on" value EW. The example of the control block SB in FIG. 4c differs from the data time block DB according to FIGS. 4a, b in that, in the number range ZX from 8 to D, an "off" value AW is additionally assigned to the last time segment ZS 11.

The advantage of the coding according to FIGS. 4a-c is that a data byte B can be transmitted by two data time blocks DB in the selected number M of time segments DB. To this end, 22 time segments ZS are used in the example for a data byte B. In contrast, the method proposed in the standard ISO/IEC 15693, Part 2, "Air Interface and Initialization" requires 32 time segments ZS. This means that, if the example of the ISM frequency band is used with the invention, a data rate of 38.52 kbit/s can be achieved. In contrast to the original 26.48 kbit/s according to the standard, a data rate increase of at least 45% can be achieved with the invention.

Figure 5A:
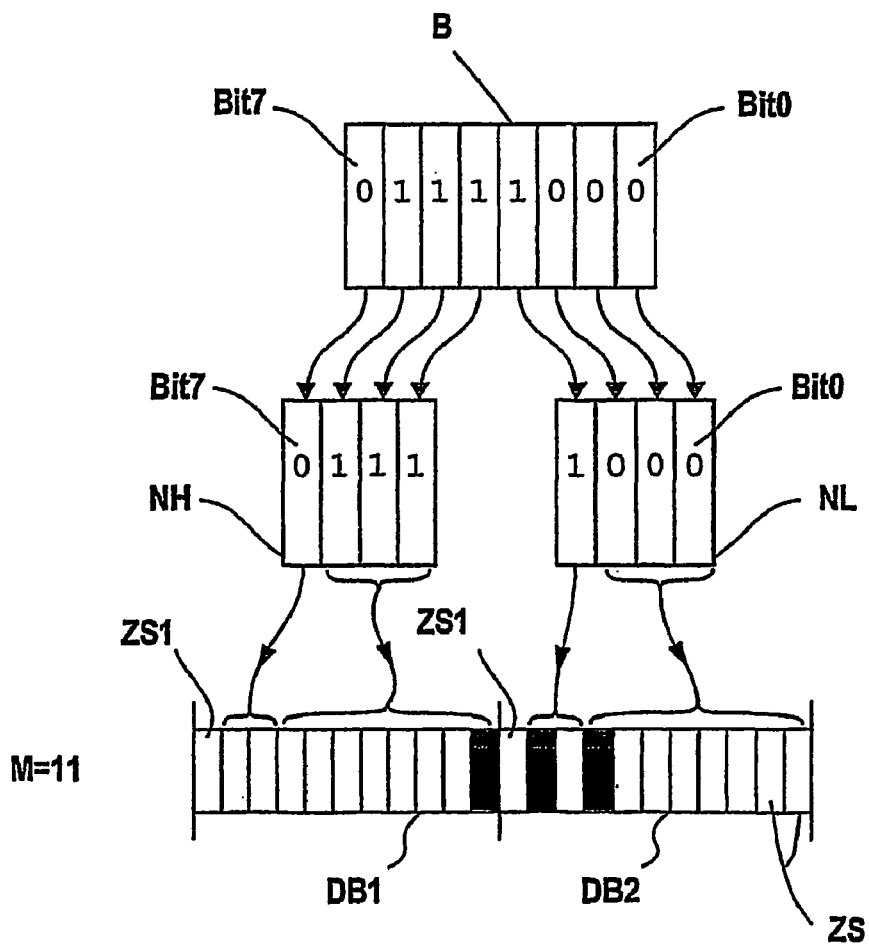
FIGS. 5a-c: show examples of the coding of a data byte according to the invention, said byte being coded according to the example in FIGS. 4a-b into a data time block with a differing number of time segments.
Figure 5B:
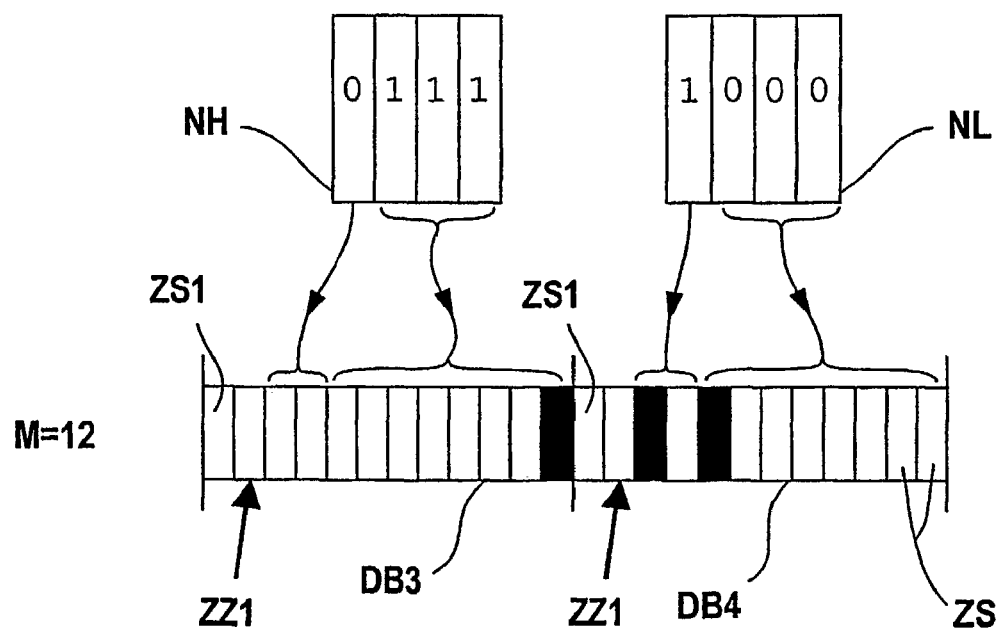
Figure 5C:
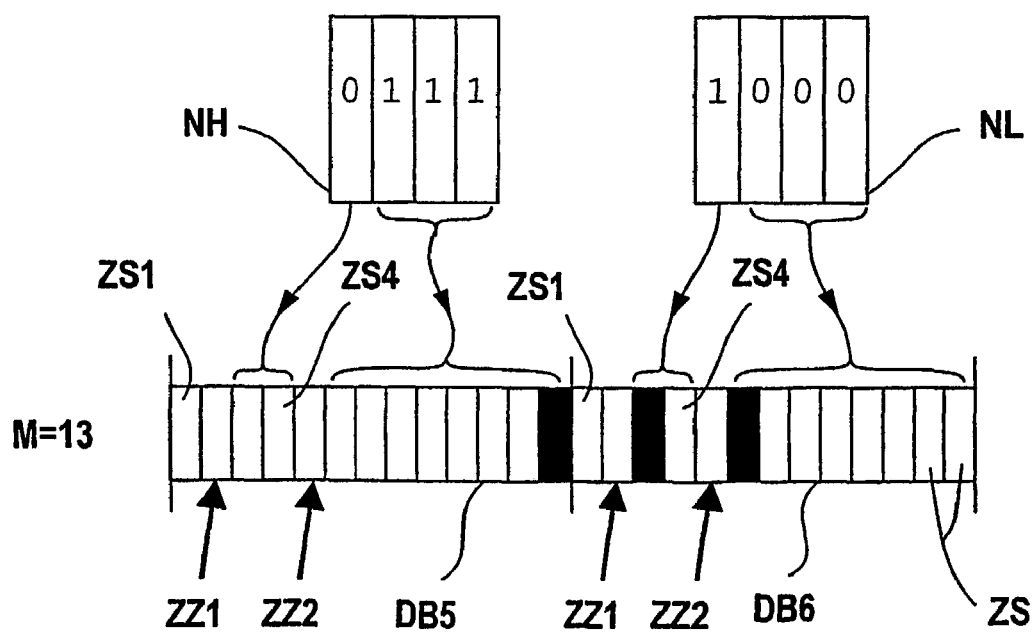

FIGS. 5a-c show examples of the coding according to the invention of a data byte B which, according to the example in FIGS. 4a-b, is coded into a data time block DB1-DB6 with a different number M of time segments ZS. Here, FIG. 5a again illustrates how an example of a data byte B with the value of, for example, 01111000 is coded into two data time blocks DB1, DB2. This example shows that a sequence of time segments ZS can also occur within the two data time blocks DB1, DB2, forming a concatenation of three "on" and "off" values EW, AW. Sequences of this type help to increase the sideband modulation.

According to another embodiment of the invention, the number M of time segments ZS is increased to twelve in the example in FIG. 5b, corresponding to a further design of the invention. Here, an additional time segment ZZ1 is inserted, e.g. following the first time segment ZS1. The advantageous result of this is that only sequences of time segments ZS can occur within a sequence of data time blocks DB3, DB4 which form a concatenation of a maximum of two "on" and "off" values EW, AW. This results in a reduction in the sideband modulation. In comparison with the example in FIG. 5a, the maximum data rate is reduced slightly to around 35.31 kbit/s.

Furthermore, the number M of time segments ZS is increased to thirteen according to the embodiment of FIG. 5c of the invention. Here, an additional time segment ZZ2 is in turn inserted, e.g. following the fourth time segment ZS4. The advantageous result of this is that, within a sequence of data time blocks DB5, DB6, a time segment ZS with an "off" value AW is followed by at least two time segments ZS with an "on" value EW. This results in a further reduction in the sideband modulation. Compared with the examples in FIGS. 5a-b, the maximum data rate is again slightly reduced to around 32.59 kbit/s.

The above description of the preferred embodiments has been given by way of example. From the disclosure given, those skilled in the art will not only understand the present invention and its attendant advantages, but will also find apparent various changes and modifications to the structures and methods disclosed. It is sought, therefore, to cover all such changes and modifications as fall within the spirit and scope of the invention, as defined by the appended claims, and equivalents thereof.

What is claimed is:

1. A method for coding data packets having at least one control command, comprising:

dividing the data packets by a coding device into sequences, each sequence having at least one control time block;

dividing the at least one control time block by the coding device into a predefined number of consecutive time segments, each consecutive time segment having an on-value or an off-value with each off-value time segment immediately followed by at least one on-value time segment, and the predefined number of consecutive time segments is between eleven and thirteen, inclusive;

coding the at least one control command comprising an eight-bit byte by the coding device into the consecutive time segments of the control block; and transmitting the data packets via a contactless data transmission path.

2. The method according to claim 1, wherein each time segment with the off-value cannot be immediately followed by another time segment with the off-value.

3. The method according to claim 1, wherein an eight-bit byte is used as a smallest data unit for control commands and data bytes.

4. The method according to claim 1, wherein:

the data packets further comprise at least one data byte, the data packets are divided into sequences comprising the at least one control time command and at least two data time blocks, the at least two data time blocks are each divided into a predefined number of consecutive time segments, and the at least one data byte is coded into the consecutive time segments of the at least two data time blocks.

5. The method as claimed in claim 4, further comprising dividing the data byte each into two nibbles prior to said coding of two consecutive ones of the data time blocks into the time segments.

6. The method as claimed in claim 5, further comprising:

selecting a predefined first number of bits of one of the nibbles; and coding the selected predefined first number of bits into a second number of selected time segments, wherein the second number of the selected time segments has a value which corresponds to the selected predefined first number of bits of the nibble exponentiated with base 2.

7. The method as claimed in claim 6, wherein the selected predefined first number of bits of the nibble is three.

8. The method as claimed in claim 4, wherein a maximum of the number of the time segments of at least one of the control time blocks and the data time blocks is eleven.

9. The method as claimed in claim 8, wherein, in said coding, only sequences of time segments which form a concatenation of maximum of three on-value and off-value are formed within a sequence of the data time blocks.

10. The method as claimed in claim 4, wherein a maximum of the number of the time segments of at least one of the control time blocks and the data time blocks is twelve.

11. The method as claimed in claim 10, wherein, in said coding, only sequences of time segments which form a concatenation of a maximum of two on-value and off-value are formed within a sequence of data time blocks.

12. The method as claimed in claim 4, wherein a maximum of the number of the time segments of at least one of the control time blocks and the data time blocks is thirteen.

13. The method as claimed in claim 12, wherein, in said coding, within a sequence of the data time blocks, one of the predetermined number of time segment with the off-value is followed by at least two time segments with the on-value.

14. The method as claimed in claim 4, wherein the number of the time segments of at least one of the control time blocks is not higher than the number of the time segments of the one of the data time blocks.

15. The method according to claim 1, wherein the control command is at least one of Start, Read Data, Write Data, Sleep, Wake Up and Stop.

16. A method for coding data packets having at least one control command and data bytes, comprising:

dividing the data packets by a coding device into sequences of at least one control time block and data time blocks;

dividing the at least one control time block and the data time blocks by the coding device into a predefined number of time segments, the time segments having an on-value or an off-value;

coding at least one control command by the coding device into the time segments of the control time block;

dividing data bytes by the coding device each into two nibbles, coding each data byte of two consecutive data time blocks by the coding device into the time segments;

selecting by the coding device a predefined first number of bits of one of the nibbles ; and coding the selected predefined first number of bits by the coding device into a second number of selected time segments, wherein the second number of the selected time segments has a value which corresponds to the selected predefined first number of bits of the nibble exponentiated with base 2;

transmitting the data packets via a contactless data transmission path;

wherein the selected predefined first number of bit of the nibble is three, wherein each time segment with an off-value is followed by at least one time segment with an on-value, and wherein the selected time segments are consecutive, the selected time segments are pre-assigned the on-value, and respective digital values of the three selected bits of the nibble are coded as the off-value into the selected time segments.

17. A mobile data carrier device for contactless exchange of data packets with a transceiver, comprising:

a coding device that codes data packets having at least one control command and data bytes, wherein said coding device divides the data packets into sequences of at least one control time block and data time blocks, divides the at least one control time block and the data time blocks into a predefined number (M) of consecutive time segments, the consecutive time segments having an on-value or an off-value, and codes at least the control command into the consecutive time segments of the control time block and the data bytes into the time segments of two consecutive data time blocks (DB), wherein each time segment with an off-value is immediately followed by at least one time segment with an on-value, wherein the data packets are transmitted via a contactless data transmission path, wherein the control command comprises an eight-bit byte, and wherein the predefined number (M) of consecutive time segments satisfies the condition $11 \leq M \leq 13$.

18. A read-write device for contactless exchange of data packets with a transceiver, comprising:

a coding device that codes data packets having at least one control command and data bytes, wherein said coding device divides the data packets into sequences of at least one control time block and data time blocks, divides the at least one control time block and the data time blocks into a predefined number (M) of consecutive time segments, the consecutive time segments having an on-value or an off-value, and codes at least the control command into the consecutive time segments of the control time block and the data bytes into the time segments of two consecutive data time blocks, wherein each time segment with an off-value is immediately followed by at least one time segment with an on-value, wherein the data packets are transmitted via a contactless data transmission path, wherein the control command comprises an eight-bit byte, and wherein the predefined number (M) of consecutive time segments satisfies the condition $11 \leq M \leq 13$.

19. An identification system, comprising:

a read-write device; and at least one mobile data carrier device;

wherein said device and said carrier are configured to exchange data packets without contacting and over a transmission path, the data packets having at least one control command and data bytes; and wherein the data packets are divided into sequences of at least one control time block and data time blocks, the at least one control time block and the data time blocks are divided into a predefined number (M) of consecutive time segments, the consecutive time segments having an on-value or an off-value, and at least the control command are coded into the consecutive time segments of the control time block and the data bytes are coded into the consecutive time segments of two consecutive data time blocks, wherein each time segment with an off-value is immediately followed by at least one time segment with an on-value, wherein the data packets are transmitted via a contactless data transmission path, wherein the control command comprises an eight-bit byte, and wherein the predefined number (M) of consecutive time segments satisfies the condition $11 \leq M \leq 13$ .

* * * * *